No. 841,709. PATENTED JAN. 22, 1907.
F. C. NEWELL.
ELECTRIC BRAKE.
APPLICATION FILED MAY 3, 1900.

No. 841,709. PATENTED JAN. 22, 1907.
F. C. NEWELL.
ELECTRIC BRAKE.
APPLICATION FILED MAY 3, 1900.

WITNESSES:

INVENTOR,
Frank C. Newell,
by T. J. Hogan,
Att'y.

No. 841,709. PATENTED JAN. 22, 1907.
F. C. NEWELL.
ELECTRIC BRAKE.
APPLICATION FILED MAY 3, 1900.

WITNESSES:

INVENTOR,
Frank C. Newell,
by T. J. Hogan,
Att'y.

UNITED STATES PATENT OFFICE.

FRANK C. NEWELL, OF WILKINSBURG, PENNSYLVANIA, ASSIGNOR TO THE WESTINGHOUSE AIR BRAKE COMPANY, OF PITTSBURG, PENNSYLVANIA, A CORPORATION OF PENNSYLVANIA.

ELECTRIC BRAKE.

No. 841,709.  Specification of Letters Patent.  Patented Jan. 22, 1907.

Application filed May 3, 1900. Serial No. 15,348.

*To all whom it may concern:*

Be it known that I, FRANK C. NEWELL, a citizen of the United States, residing in Wilkinsburg, county of Allegheny, State of Pennsylvania, have invented or discovered a certain new and useful Improvement in Electric Brakes, of which improvement the following is a specification.

The object of my invention is to provide an improvement in electric brakes for electrically-propelled railway-cars; and it consists in new and improved means, independent of the running-controller, whereby the supply of current from the line to the running-controller may be cut off and the brakes may be applied and controlled, and whereby the running-controller may be connected with the braking-circuit to control the brakes; and it further consists in a new and improved combined brake switch and controller and in certain combinations and features of construction as hereinafter set forth.

In the embodiment of my invention as shown in the drawings I employ in combination with a running-controller of an electrically-propelled car and its connections a combined brake switch and controller, in which by a single movement of the handle of the brake switch and controller the brake-switch is adapted to cut off the supply of current from the main line to the controller to apply the brakes and to connect the running-controller and the braking-controller with the braking-circuit to permit control of the brakes by the running-controller and by the braking-controller, whereby either may be used for this purpose.

In the accompanying drawings, which illustrate an application of my invention.

Figure 1:
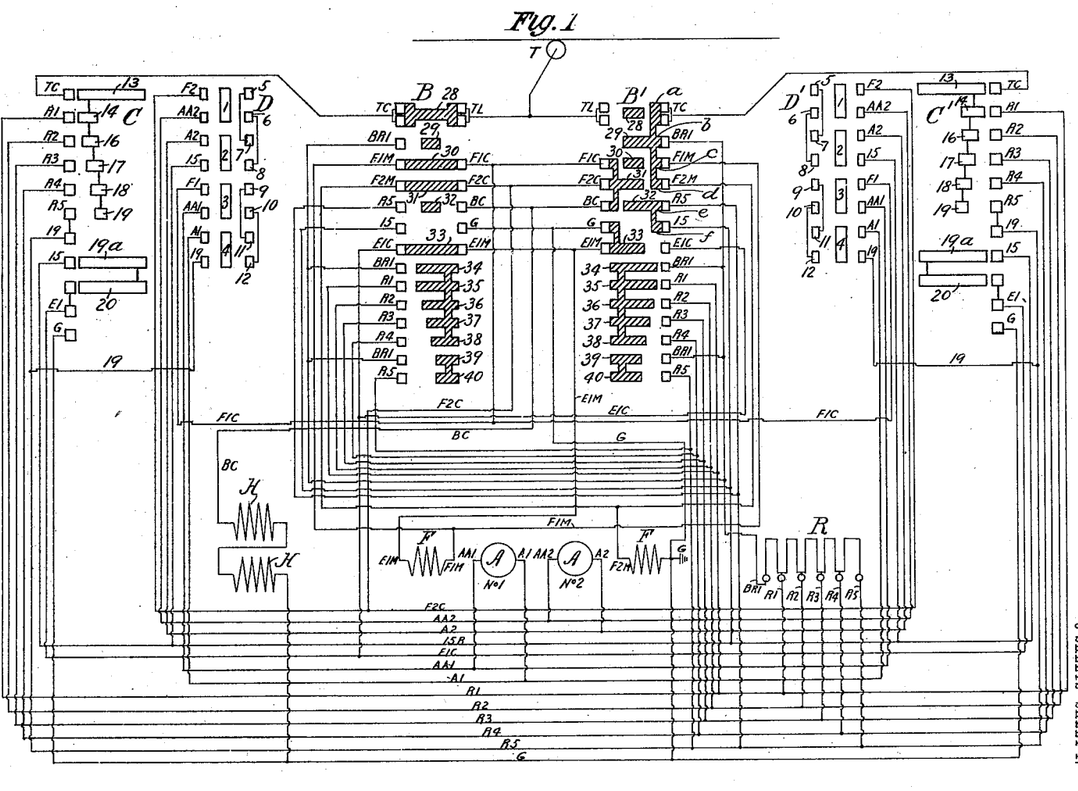
Figure 1 is a diagram showing the circuits and connections on a car for running and for braking.

In Fig. 1 of the drawings I have shown an application of my improvement to a car equipped with two motors and a magnetic brake device and with a running-controller and reversing-switch at each end of the car, two braking switches and controllers being employed. The running-controllers C C' and the reversing-switches D D' at opposite ends of the car are shown in the open or neutral position. The braking - switch B is shown in the running position and the braking-switch B' in the braking position.

The device herein referred to as a "braking switch and controller" consists of a switch and a resistance-controlling device on the same shaft and operative by movement of the same handle, the switch forming the upper portion of the device and having the contact-bars 29 to 33, inclusive, and the resistance-controlling device having the contact-bars 34 to 40, inclusive. The construction of the braking device is such that although the upper portion or switch and the lower porton or resistance-controlling device are on the same shaft and operative by the same handle the switch has but a single movement from the running position to the braking position and no movement in the same direction beyond the braking position, but the lower portion or resistance-controlling device is further movable in the same direction and by the same handle independently of the switch—that is, while the switch remains stationary in the braking position.

When the car is running and the brakes are off, both of the braking-switches are in the running position—that is, in the position occupied by the switch B—and one of the controllers C or C' should be in position to connect the motors with the main supply-line by contact of the bar 13 with the terminal point of the lead TC and by contact of one or more of the bars 14 16 17 18 19 with the terminal points of the leads R1 R2 R3 R4 R5.

The connections and the course of the current when running may be traced by referring to the left-hand portion of Fig. 1, in which the braking switch and controller B is shown in the running position, the braking-switch B' being also supposed to be in the running position.

For running ahead the reversing-switch at the front end of the car should be moved so that the contact-bars 1 2 3 4 are in contact with the points F2 AA2 A2 15, &c., and for running in the reverse direction the contact-points 5 to 12 should be in contact with the points F2 AA2, &c.

When the car is being operated by means of the controller C, the controller C' and the reversing-switch D' should be in the open or neutral position, as shown, and both of the switches B and B' should be in the running position. If the car be supposed to be running forward with the controller C in position to make contact between the bars 13 14 and the points TC and R1, current will flow from the main line through the trolley T and lead TC to bars 13 14, through lead R1, resistance device R, leads R5 and 19, contact-bar 4 on the reversing-switch D, lead A1, armature A of No. 1 motor, lead AA1, contact-bar 3 on reversing-switch, leads F1 and F1C, contact-bar 30 on the braking-switch B, lead F1M, through field F of No. 1 motor, lead E1M, contact-bar 33 on the braking-switch B, lead E1C to contact-bars 20 and 19ª on running-controller C, lead 15, contact-bar 2 on reversing-switch D, lead A2, armature A of No. 2 motor, lead AA2, contact-bar 1 of reversing-switch D, lead F2C, contact-bar 31 on braking-switch B, lead F2M, through field F of No. 2 motor to ground.

The brakes may be applied by a single movement of the braking-switch, by which it is moved from the position occupied by the switch B to the position occupied by the switch B', and after this movement has been made the brake may be controlled either by the running-controller or by the braking-controller, as will be hereinafter described.

In order to trace the connections and to understand the operation of my improvement in applying and controlling the brakes, the right-hand portion of Fig. 1 may be considered, the controller C' being regarded for the time being as the operating-controller on the front end of the car and the reversing-switch D' being set for running ahead—that is, with the contact-bars 1 2 3 4 in position to make contact with the points F2 AA2 A2 15 F1, &c. When running, both braking-switches are in the position occupied by switch B in Fig. 1, and to apply the brakes the braking-switch corresponding to the controller then in use is shifted by a single movement to the position occupied by switch B' in Fig. 1. The controller C and the reversing-switch D being at the opposite end of the car from the operator should be locked in the open or neutral position in which they are shown in Fig. 1 of the drawings. The running-controller C' may be in any position, open or closed, when the switch B' is moved to the braking position without interfering with the application of the brakes, the position of the running-controller affecting only the resistance in the braking-circuit.

The movement of the braking-switch B' to the position shown in Fig. 1 disconnects the controller C' from the main line and cuts off the supply of current and connects the motors in a local braking-circuit, so that as the car continues to run by its own momentum the motor or motors operate as generators to supply current to the braking-circuit. Current then flows from the armatures A of No. 1 motor through lead A1, contact-bar 4 on reversing-switch D', lead 19, and R5, through all of the resistance devices R, lead BR1, contact-bar 29 on braking-switch B', leads F1M and F2M, through the fields of both motors. From the field of No. 1 motor the current flows through lead E1M, contact-bar 33 on braking-switch B', lead G, and through the coils H of the brake device. From the field of No. 2 motor the current flows through the lead G to the coils H of the brake device. From the coils H of the brake device the current flows through the lead BC, contact-bar 31 on the braking-switch B', leads F1C and F2C, through the contact-bars 3 and 1, respectively, on the reversing-switch D', and through leads AA1 and AA2 to the armatures A of the motors. From the armature of No. 2 motor the current flows through lead A2, contact-bar 2 on the reversing-switch D', lead 15, contact-bar 32 on the braking-switch B', and lead R5, where it joins with the current from the armature of No. 1 motor in the branch leading to the resistance devices R.

When the brakes are applied, the current in the local braking-circuit may be controlled either by the running-controller C' or by the braking-controller B'. If the running-controller C' be moved to the right, so as to make contact between the bars 13 14 and the terminal points TC and R1, the current will be shunted around a portion of the resistance and the main portion of the current will pass out of the resistance devices R through the lead R1 instead of passing through the whole of the resistance, and as the controller is moved farther to the right the resistance in the braking-circuit will be further diminished. To increase the resistance after it has been thus diminished, the controller should be moved back to the left.

In order to control the current in the local braking-circuit, and thereby control the braking force by operating the same handle by which the braking-switch is moved, I provide a resistance-controlling device on an extension of the shaft on which the braking-switch is mounted and provide means whereby the controlling device may be operated after the brakes are applied without moving the braking-switch, the construction for this purpose being shown in Figs. 2 to 14. The contact-bars 34 to 40 on the resistance-controlling device are by means of this construction adapted to make contact with terminal points of the leads BR1, R1, R2, R3, R4, and R5 from the resistance devices R, the shaft of the braking-controller being rotated for this purpose without moving the braking-switch.

If the braking-controller B' be moved, so as to bring the bars 34 35 in contact with the points BR1 and R1, the current will be shunted around a portion of the resistance in the same manner as already described in referring to the control of the brakes by the running-controller, and as the braking-controller is moved farther in the same direction, the resistance in the braking-circuit will be further diminished until, when the contact-bars 39 and 40 make contact with the points BR1 and R5, the current will be shunted around all of the resistance devices R, and the resistance in the braking-circuit will be a minimum. By movement of the braking-controller in the opposite direction the resistance in the braking-circuit may be increased until the controller is returned to the position which the switch and controller B' occupies in Fig. 1 of the drawings, the current then passing through all of the resistance devices R. A further reverse movement of the handle of the braking-controller will then shift the brake-switch and take off the brakes.

Figure 2:
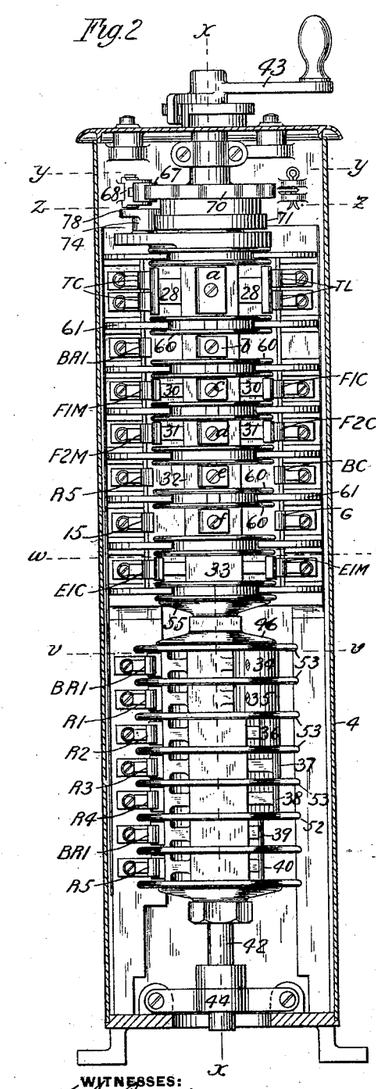
Fig. 2, a view showing the braking switch and controller in elevation and its casing in section, the parts being in what will hereinafter be referred to as the "running" position.
Figure 3:
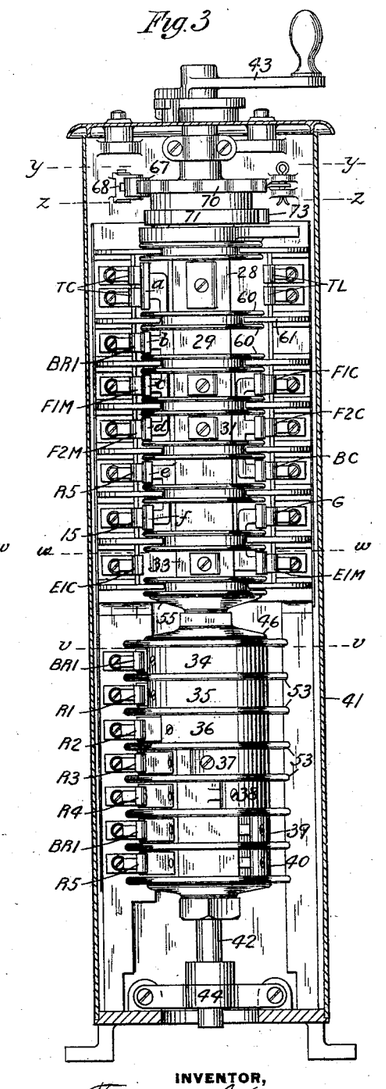
Fig. 3, a similar view of the braking switch and controller with the braking-switch in the braking position.
Figure 4:
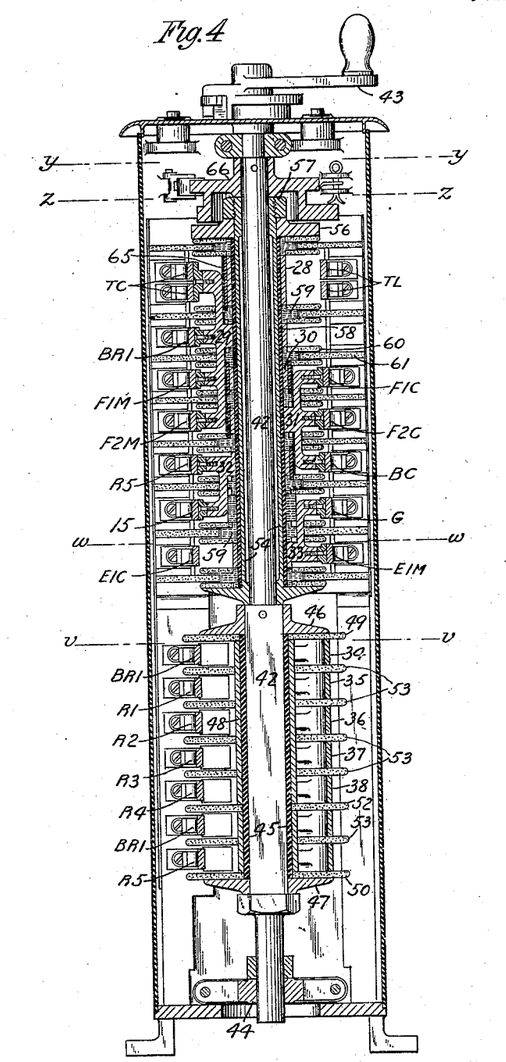
Fig. 4, a vertical section of the braking-controller with the parts in position for braking.
Figure 5:
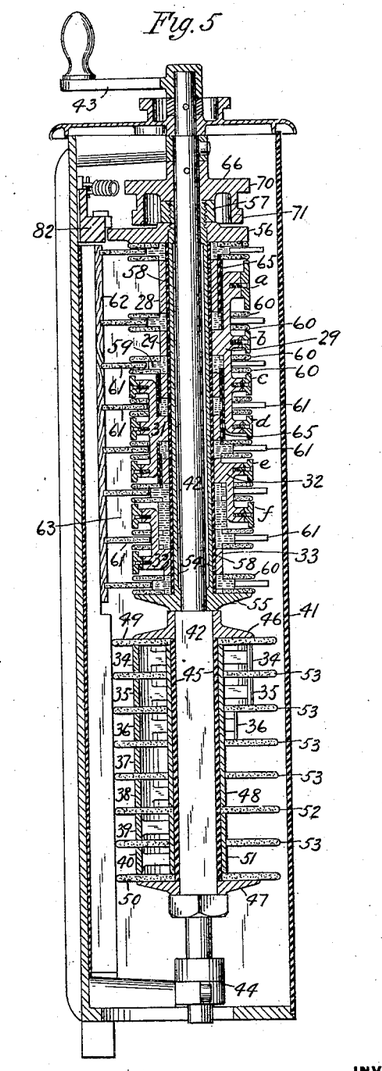
Fig. 5, a vertical section on the line $x\,x$ of Fig. 2.

The combined switch and resistance controlling device, which, as a whole, may be referred to as the "braking-controller," is shown in elevation in Figs. 2 and 3, the casing 41 being shown in section, the parts being shown in the running position in Fig. 2 and in the first position for braking in Fig. 3.

The shaft 42 of the braking-controller is provided at its upper end with an operating-handle 43 and extends downward through the switch and resistance controlling device to the base, where it is supported on a bearing 44. The lower portion of the shaft 42 is square in cross-section and covered with insulating material 45 between the disks 46 and 47, which are secured to the shaft for the purpose of holding the parts of the resistance-controlling device in place. The contact-bars 34, 35, 36, 37, and 38 of the resistance-controlling device are formed integral with the hollow square-shaped hub 48, which is fitted over the insulating material 45 and is insulated from the metallic disk 46 by means of the disk 49, of insulating material. The contact-bars 39 and 40, by which the resistance in the braking-circuit is shunted, are formed integral with a similar hub portion 51, fitted over the lower portion of the insulated shaft and are separated from the metallic disk 47 by an insulating-disk 50, the hub portions 48 and 51 being separated from one another by an insulating-disk 52. In order to prevent sparking, the insulating-disks 53 are fitted between the contact-bars.

The upper portion of the shaft 42 is circular in cross-section and is surrounded by a metallic tube or sleeve 54, square in cross-section and formed integral with a disk 55 at its lower end and provided at its upper end with a disk 56, between which and the disk 55 the parts of the braking-switch are held in place, the disk 56 being secured in place by a nut 57 on the upper screw-threaded end of the sleeve 54.

The sleeve 54 is covered with insulating material 58, and the contact-bars 28 to 33 are formed with square-shaped hollow hub portions which are fitted around the insulation on the sleeve and separated from one another by insulating-disks 59. On each side of the disks 59 are other larger disks 60, of insulating material, which are separated from one another by the thickness of the reduced edge of the disks 59, so as to leave a space between them. Comparatively thick sheets or boards of insulating material 61 are secured to a back board 62, which is secured to the back of the casing, and these sheets or boards 61 extend into the spaces between the insulating-disks 60 and form therewith a certain means of preventing sparking between the contact-points of the switch. In the spaces between the sheets or boards 61 are strips of insulating material 63, which are secured to the back board 62 and extend therefrom to a point near the contact-points of the fingers 64, to which the wiring-leads are connected, the object of these strips being, so far as possible, to prevent sparking between the fingers and the movable contact-bars of the switch.

Instead of providing separate bars in all of the spaces between the insulating-disks to correspond with the number of contact-points on the movable portion of the switch and a corresponding number of fingers for making contact therewith I simplify the construction of the braking-switch by forming some of the bars with extensions which project into spaces on either side of the space in which the hub of the bar is located, thereby reducing the length which would otherwise be required for the switch and securing the desired contacts with the employment of fewer fingers than would otherwise be necessary. This feature of my improvement may be understood by reference to Figs. 4 and 5 of the drawings, in which the bar 29 is shown provided with extensions which overlap the bars 28, 30, and 31 and have their contact-points $a$, $b$, $c$, and $d$ in the same spaces between the disks as the bars 28 30 31, but at an angle of ninety degrees therefrom, so that when the braking-switch is moved from the running position to the braking position through an angle of ninety degrees the contact-points *a c d* will make contact with the same fingers which in the running position engaged the bars 28, 30, and 31. The bars 31, 32, and 33 are also shown provided with overlapping portions or extensions. In order to prevent sparking, the space between the extensions or overlapping portions and the bars which they overlap is filled with insulating material 65.

Figure 6:
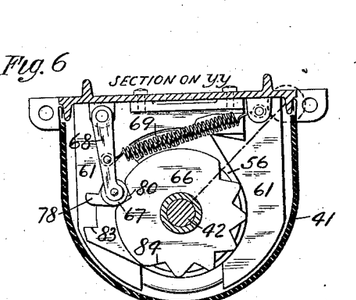
Fig. 6, a transverse section on the line $y\,y$ of Fig. 2.

A collar 66 is rigidly secured to the shaft 42, and its upper projecting edge 70 is provided with a number of notches adapted to be engaged by a roller 67 on a pivoted arm 68, which is acted on by a spring 69, so that when one of the notches is in position to be engaged by the roller the roller will be pressed into the notch and tend to resist movement of the collar, as shown in Fig. 6. The lower projecting edge 71 of the collar 66 is formed with a notch 72, and on one side of the notch is a stop or projection 73, adapted to engage with a pawl 74, which is pivoted on the disk or plate 56. The pawl 74 is provided with a roller 75, which is adapted to bear against and roll on the edge of a plate 76, which is secured to and projects from the back of the casing, as shown in Figs. 6 to 9. The edge of the plate 76, against which the roller bears, has for most of its length the curvature of a circle whose center lies in the axis of the shaft 42, and the distance of the edge of the plate from the center is such that as the roller moves along the edge of the plate the pawl will be held in engagement with the notch 72 on the lower projecting portion 71 of the collar 66. A stop 77 is formed on or secured to the plate 76 in position to be engaged by the projection 78 on the pawl, so as to tilt the pawl and lift it out of engagement with the notch 72, as shown in Fig. 8, the portion 79 of the edge of the plate 76 being so formed as to permit this movement of the pawl.

Figure 7:
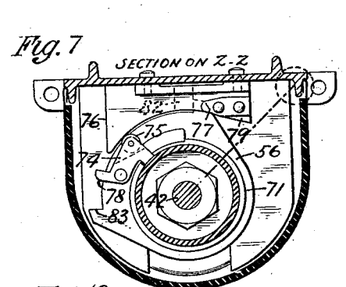
Figs. 7, 8, and 9, transverse sections on the line $z\,z$ of Figs. 2 and 3.
Figure 8:
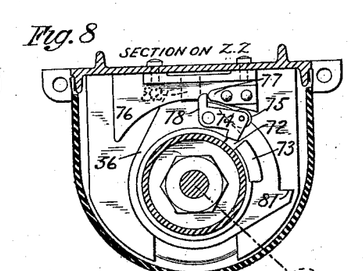
Figure 9:
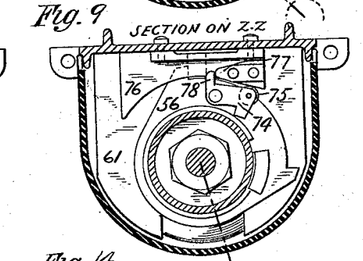
Figure 10:
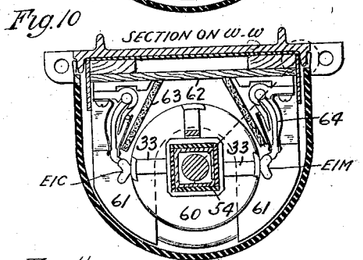
Fig. 10, a transverse section on the line $w\,w$ of Fig. 2.
Figure 11:
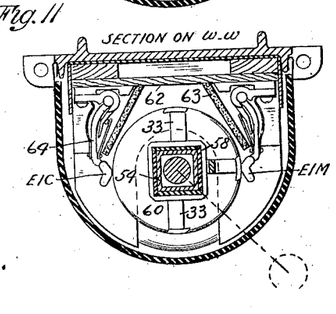
Fig. 11, a transverse section on the line $w\,w$ of Fig. 3.

When the braking-switch is in the running position, the operating-handle 43 will be in the position shown by the dotted line in Figs. 6 and 7, the plate 56 and the collar 66 will be in the positions shown, locked together by means of the pawl 74, the projection 81 on the plate 56 will bear against the stop 82 on the back of the casing, and the spring-pressed arm 68 and roller 67 will hold the switch in position. In order to apply the brakes, the operating-handle 43 will be moved to the position indicated by the dotted line in Fig. 8, and by this movement the braking-switch will be moved to the braking position, (shown in Figs. 3 and 4,) which is also the position of the switch B' in the diagram Fig. 1, and further movement of the switch in the same direction will be prevented by the engagement of the projection 83 on the plate 56 with the stop 82 on the back of the casing.

All of the parts of the braking-switch and controller will be rotated through the same angle by this movement of the operating-handle, because during this movement the switch, which forms the upper portion of the device, is locked to the shaft 42 by means of the pawl 74, and the resistance-controlling device is at all times rigidly connected to and movable with the shaft.

When the operating-handle is being moved to the position indicated by the dotted line in Fig. 8, the projection 78 on the pawl 74 comes into contact with the stop 77 a little before the projection 83 on the plate 56 comes into contact with the stop 82 on the back of the casing, and the pawl is disengaged from the collar 66 by the time the projection 83 engages the stop 82. Any further movement of the operating-handle in the same direction will not affect the position of the switch, since it is no longer locked to the collar and shaft 42 by the pawl 74, and the shaft being then free to rotate within the sleeve 54 may be further rotated in the same direction and back again to the same position to engage the contact-bars on the resistance-controlling device with the proper points or disengage them therefrom.

Figure 12:
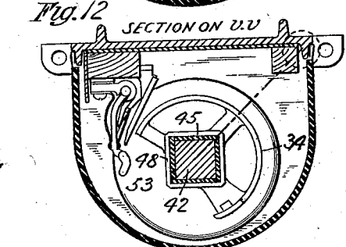
Figs. 12, 13, and 14, transverse sections on the line $v\,v$ of Figs. 2 and 3.
Figure 13:
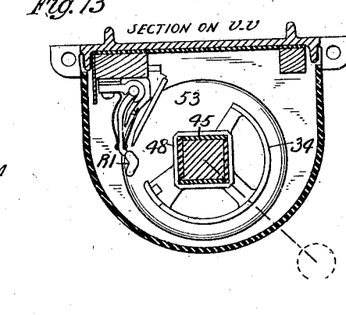
Figure 14:
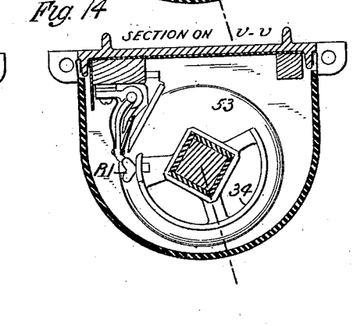

In Fig. 12 of the drawings I have shown the contact-bar 34 of the resistance-controlling device in the position which it will occupy when the braking-switch is in the running position, in Fig. 13 the position which it will occupy when the operating-handle is moved to the first position for braking, and in Fig. 14 the position it will occupy when the next further movement of the operating-handle is made—that is, the movement by which contact is made with the terminal point R1, as represented on the diagram Fig. 1.

When the operating-handle is moved to the position shown by the dotted line in Fig. 8, the roller 67 will engage the notch 84 on the edge of the collar 66 and tend to hold the parts in that position, and as the handle is moved still farther in the same direction the roller will successively engage with the corresponding notches.

The braking-controller may be located on any part of the car; but it is preferred that it should be so located that the operating-handle may be conveniently manipulated by the right hand of the motorman, and in view of this fact it will probably be most convenient to locate it alongside of and to the right of the running-controller on the platform of the car.

If the reversing-switch at either end of the car—that is, at either end from which the car is being operated by the running-controller—be moved into the reversed position for running backward, it will be seen from an inspection of the diagram Fig. 1 that the braking-switch and resistance-controlling device may be operated to apply and control the brakes, as in running forward.

I claim as my invention and desire to secure by Letters Patent—

1. The combination, on an electrically-operated car, of a running-controller, and a braking-controller which is adapted to apply the brakes and to connect the running-controller with the braking-circuit whereby the brakes may be controlled either by the running-controller or the braking-controller.

2. The combination, on an electrically-operated car, of a motor, a local braking-circuit, a braking-controller adapted to connect the motor to act as a generator for the braking-circuit and also adapted to control the current in said braking-circuit, and a running-controller for the motor which is also adapted to control the current in the braking-circuit by the same movements as in running.

3. The combination, on an electrically-operated car, of a motor, a running-controller, a local braking-circuit, and a braking-controller adapted, by one movement, to cut out the running-controller from the main line and to connect the motor and running-controller in the braking-circuit, and adapted by a further movement to control the current in the braking-circuit.

4. The combination, on an electrically-operated car, of a running-controller, a reversing-switch, and a braking-controller which is adapted to apply the brakes, when the reversing-switch is in the position for running ahead or for running backward, and to connect the running-controller in the braking-circuit, whereby the brakes after being applied may be controlled by the running-controller or by the braking-controller.

5. In an electric controller, the combination, of a switch and a resistance-controlling device mounted on a shaft, and means whereby the switch and controlling device may be moved together or the resistance device may be moved independently of the switch by rotation of the shaft.

6. In an electric controller for a braking-circuit, the combination, of a braking-switch and a resistance-controlling device mounted on the same shaft, and means whereby the brakes may be applied by a single movement of the braking-switch and shaft, and the resistance-controlling device operated to vary the resistance in the braking-circuit without moving the braking-switch.

7. In an electric controller, the combination, of a switch mounted on an operating-shaft which is rotatable independently of the switch, a resistance-controlling device rotatable with the shaft and means for locking the switch to cause it to rotate with the shaft and unlocking it to permit independent rotation of the shaft.

8. The combination, in a controller for electric circuits, of an operating-shaft, a resistance-controlling device secured to and movable with the shaft, a switch mounted on the shaft, and means for automatically locking and unlocking the switch and shaft, whereby they may be moved together or the shaft and resistance-controlling device may be moved independently of the switch.

9. The combination, in a controller for electric circuits, of an operating-shaft, a resistance-controlling device secured to and movable with the shaft, a switch mounted on the shaft, a pawl adapted to lock the shaft and switch together, and means for automatically effecting engagement and disengagement of the pawl, whereby the shaft and switch may be operated together or the shaft and resistance device may be operated independently of the switch.

10. In an electrical controlling device, the combination, of a rotatable carrier, contact-bars secured thereon and adapted to rotate in different planes, stationary contact-fingers located in corresponding planes, one of the contact-bars being adapted to cross-connect two of the stationary contact-fingers in the same plane of rotation, and another bar having an extension overlapping the said cross-connecting bar.

11. In an electrical controlling device, the combination, of a rotatable carrier having contact-bars adapted to rotate in different planes, stationary contact-fingers located in corresponding planes, one of the contact-bars adapted to connect two stationary fingers in the same plane of rotation, the said bar having an extension adapted to make contact with another stationary finger in a different plane of rotation when the carrier is rotated to a different position.

12. In an electrical controlling device, the combination, of a rotatable carrier, having contact-bars adapted to rotate in different planes, a plurality of sets of stationary contact-fingers, one of the contact-bars being adapted to connect fingers of opposite sets in the same plane of rotation, and an extension from one of the bars overlapping another bar whereby the same stationary finger may make contact with either bar by the rotation of the carrier.

13. In an electrical controlling device, the combination, of a rotatable carrier having contact-bars adapted to rotate in different planes, a plurality of sets of stationary contact-fingers located in corresponding planes, and extensions from some of the bars overlapping other bars whereby fingers of different sets will be connected when the carrier is in one position and fingers of the same set will be connected together when the carrier is in another position.

14. In an electrical controlling device, the combination, of a rotatable carrier, two contact-bars mounted thereon in different planes of rotation and each having an extension which projects into the same common plane of rotation, and stationary contact points or fingers adapted to be engaged by the contact-bars and their extensions.

15. In an electrical controlling device, the combination of a rotatable carrier having contact-bars adapted to revolve in different planes, stationary fingers for the contact-bars located in corresponding planes, and an extension from one of the bars overlapping another bar, whereby the same stationary finger may be connected with another stationary finger in the same plane of rotation or with another finger in a different plane of rotation.

In testimony whereof I have hereunto set my hand.

FRANK C. NEWELL.

Witnesses:
R. F. EMERY,
JAS. B. MACDONALD.